(12) United States Patent
Larker

(10) Patent No.: US 8,858,736 B2
(45) Date of Patent: Oct. 14, 2014

(54) AUSTEMPERED DUCTILE IRON, METHOD FOR PRODUCING THIS AND COMPONENT COMPRISING THIS IRON

(75) Inventor: Richard Larker, Vindeln (SE)

(73) Assignee: Indexator Group AB, Vindeln (SE)

( * ) Notice: Subject to any disclaimer, the term of this patent is extended or adjusted under 35 U.S.C. 154(b) by 788 days.

(21) Appl. No.: 12/519,422

(22) PCT Filed: Sep. 3, 2007

(86) PCT No.: PCT/SE2007/050607
§ 371 (c)(1),
(2), (4) Date: Aug. 27, 2009

(87) PCT Pub. No.: WO2008/076051
PCT Pub. Date: Jun. 26, 2008

(65) Prior Publication Data
US 2010/0006189 A1    Jan. 14, 2010

(30) Foreign Application Priority Data
Dec. 16, 2006  (SE) .................................. 0602736

(51) Int. Cl.
*C21D 5/00*    (2006.01)
(52) U.S. Cl.
USPC ............................ 148/321; 148/322; 148/548
(58) Field of Classification Search
USPC .................................. 148/545, 321, 322, 548
IPC ...................................... C21D 5/00,1/20, 1/185
See application file for complete search history.

(56) References Cited

U.S. PATENT DOCUMENTS

2004/0071584 A1    4/2004  Molinari et al.
2004/0171434 A1*   9/2004  Radcliffe et al. ............. 473/324

FOREIGN PATENT DOCUMENTS

| EP | 0 203 050 | 11/1986 |
| GB | 2 133 805 | 8/1984 |
| JP | 62112753 A | 5/1987 |
| JP | 02166257 A | 6/1990 |

OTHER PUBLICATIONS

Effect of silicon content on impact properties of austempered ductile iron, Materials Science and Technology, Apr. 1997, 13(5):408-414.*
International Search Report dated Mar. 20, 2008, from corresponding PCT application.
European Patent Office Communication, dated Aug. 8, 2011, in 07794212.6.

* cited by examiner

*Primary Examiner* — Weiping Zhu
(74) *Attorney, Agent, or Firm* — Young & Thompson

(57) ABSTRACT

Austempered ductile iron (ADI) for components requiring high strength and/or ductility, which has a silicon content of 3.35 weight-% to 4.60 weight-%, and which is obtainable by performing an ADI-heat treatment using an austenitization temperature of at least 910° C.

16 Claims, 1 Drawing Sheet

AUSTEMPERED DUCTILE IRON, METHOD FOR PRODUCING THIS AND COMPONENT COMPRISING THIS IRON

TECHNICAL FIELD

The present invention concerns an austempered ductile iron (ADI) with a mainly ausferritic matrix for components requiring high strength and ductility (such as components having an ultimate tensile strength of at least 900 MPa and/or a yield strength of at least 600 MPa and/or a fracture elongation of at least 6%). The present invention also concerns a method for producing such austempered ductile iron.

BACKGROUND OF THE INVENTION

Ductile iron (also called nodular cast iron) is a cast iron that contains carbon in the form of graphite spheroids/nodules. Due to their shape, these small spheroids/nodules of graphite are better at reducing stress than the finely dispersed graphite flakes in grey iron, thereby imparting greater tensile strength thereto as compared with other types of iron.

Austempered ductile iron (ADI) (which is sometimes referred to as "bainitic ductile iron" even though when correctly heat treated, ADI contains little or no bainite due to the high silicon level compared to common steels) represents a special family of ductile iron alloys which possess improved strength and ductility properties as a result of a heat treatment called "austempering".

In a typical austempering heat treatment cycle a casting is firstly heated and then held at an austenitizing temperature until the casting becomes fully austenitic and the matrix becomes saturated with carbon. After the casting is fully austenitized, it is quenched in a salt bath at a quenching rate that is high enough to avoid the formation of pearlite (or solution strengthened ferrite) during the quenching. The casting is then held at temperature called the "austempering" temperature. The final microstructure and properties of the ADI casting are usually considered to be determined mainly by the austempering temperature and the holding time. After said isothermal austempering, the casting is cooled to room temperature.

To accelerate the solution of carbon into austenite during austenitization, a substantially fully pearlitic as-cast microstructure is usually used as a precursor in the production of ADI in order to obtain short diffusion distances from high-carbon (cementite $Fe_3C$) to low-carbon (ferrite) areas. In a ferritic ductile iron, carbon has to diffuse several orders of magnitude further from the graphite nodules into the austenite matrix which is formed, requiring a considerably longer austenitizing time and/or a higher austenitizing temperature.

ADI castings are, compared to conventional ductile iron, at least twice as strong at the same ductility level, or show at least twice the ductility at the same strength level. Compared to steel castings of the same strength, the cost of casting and heat treatment for ADI is much lower, and simultaneously the machinability is improved, especially if conducted before heat treatment. High-strength ADI cast alloys are therefore increasingly being used as a cost-efficient alternative to welded structures or steel castings, especially since components made from steel are heavier and more expensive to manufacture and finish than components made from ADI.

The superior mechanical properties of ADI emanate from an ausferritic microstructure of very fine needles of acicular ferrite in a matrix of austenite, thermodynamically stabilized by a high carbon content. The much higher silicon content in austempered ductile irons, compared to common steels, stabilizes carbon in graphite instead of cementite ($Fe_3C$), thus preventing the precipitation of carbides as long as the austempering is not too prolonged.

The chemical composition of ADI is similar to that of conventional ductile iron, i.e. about 3.4-3.8 weight-% carbon, 2.3-2.7 weight-% silicon, 0.3-0.4 weight-% manganese, a maximum of 0.015 weight-% sulphur and a maximum of 0.06 weight-% phosphorus. Depending on casting thickness, alloying elements such as up to 0.8 weight-% copper, up to 2.0 weight-% nickel, and up to 0.3 weight-% molybdenum are usually added to the base composition, to avoid the detrimental formation of pearlite due to less rapid cooling rate in the core from the austenitization temperature to the austempering temperature.

The Standard Specification for Austempered Ductile Iron Castings (Designation: A 897M-06, published by the American Society for Testing and Materials (ASTM) on Apr. 3, 2006) states (on page 7, table X1.2) that silicon is one of the most important elements in ADI because it promotes graphite formation, decreases the solubility of carbon in austenite, increases the eutectoid temperature and inhibits the formation of bainitic carbide. It also warns that excessively high levels of silicon can suppress ausferrite in localized areas by stabilizing ferrite. The recommended amount of silicon is therefore given as 2.50%±0.20%. The heat treatment parameters (temperatures, hold times and cooling rates) are not specified in the standards, but in the scientific literature the emphasis has been on the effects of austempering, while the preceding austenitizing step has caught less attention. For conventional ADI with Si levels less than 3.35% the austenitizing temperature has usually not exceeded 900° C., and in the few attempts that have been made to austemper ductile irons with high silicon amounts between 3.35% Si and 4.60% Si, the austenitizing temperatures have been below 910° C.

SUMMARY OF THE INVENTION

An object of the present invention is to provide a new kind of austempered ductile iron having an improved combination of high strength and ductility, combined with an improved machinability, especially when machined in the as-cast ferritic state.

This object is achieved by an austempered ductile iron that has a silicon content of 3.35 weight-% to 4.60 weight-%, such as 3.65-4.55 weight-%, and that is obtainable by performing an ADI-heat treatment using an austenitization temperature of at least 910° C. Such an ADI offers a highly advantageous combination of low total cost, high strength-to-weight ratio, good ductility, wear resistance, fatigue strength and improved machinability, as well as all of the production advantages of conventional ductile iron castings. The inventive ADI has mechanical properties that are superior to conventional ADI having a silicon content up to 2.50%±0.20% as well as to conventional ductile iron, cast and forged aluminum and several cast and forged steels. It is also 10% less dense than steel.

There is a common misapprehension, that dates all the way back to the first ever patent on ductile iron (namely U.S. Pat. No. 2,485,760 published in 1949), that an increased silicon level makes ductile iron less ductile. However, this is only true when making an irrelevant comparison between a ferritic ductile iron solution strengthened by a high silicon content (i.e. a silicon content over 2.7 weight-%) and a much weaker conventional ferritic material, whereas the ferritic solution strengthened ductile iron is definitely more ductile when correctly compared to conventional ferritic-pearlitic material of similar strength. Furthermore, it has been found when comparing ductile irons of similar strength (500 MPa UTS), that the standard deviation in hardness is typically reduced from ±24 HBW-units (Brinell hardness value units) for the conventional ferritic-pearlitic material down to ±4 for the ferritic solution strengthened ductile iron, and that the machinability is improved by at least 20% due to the absence of pearlite containing carbides.

The prevailing opinion in both scientific and patent literature on ADI is that neither a high silicon content (greater than 2.7 weight-%), nor a high austenitization temperature (i.e. a temperature greater than or equal to 910° C.) are beneficial, and that relatively large additions of copper, nickel and molybdenum are necessary for hardenability. On the contrary, it has been found that ADI having a high silicon content, which is austenitized at a high temperature and which contains little or no copper, nickel or molybdenum has several advantages over conventional ADI.

There are namely improvements in both the ADI's thermal treatment performance and mechanical properties. Without wishing to be bound by any theory it would seem that the unusually high silicon level increases nodularity and nodule density during the casting of the ductile iron. No expensive metallic hardenability additions of copper, nickel and molybdenum may be necessary, even when casting relatively thick components, which decreases manufacturing costs. Said hardenability additions are usually not necessary since the high silicon level provides an improved hardenability by delaying pearlite formation during cooling from the austenitization temperature to the austempering temperature, whereby said pearlite formation would otherwise weaken the microstructure. Further, in even thicker castings the microstructure produced in the core will be solution strengthened ferrite instead of pearlite, causing a lesser adverse affect on the ADI's mechanical properties.

The base composition also exhibits significantly better machinability due to the ferritic structure that is solution-strengthened by silicon. Conventional pearlitic and ferritic-pearlitic microstructures are more abrasive on tools and exhibit substantial variations in strength and hardness throughout the microstructure thereof, which makes it very difficult to optimize machining parameters and achieve narrow geometric tolerances.

The increased silicon level further delays or completely prevents the formation of embrittling bainite (ferrite+cementite $Fe_3C$), thereby allowing complete isothermal transformation to ausferrite (acicular ferrite in a matrix of ductile austenite, thermodynamically stabilized by a high carbon level) during austempering. Thermodynamic stabilization and the amount of the austenite phase after austempering are improved due to the higher enrichment of carbon obtained at the higher austenitization temperature necessary for carbon to diffuse from graphite nodules in a reasonable time during austenitization of a ferritic matrix. The inventive ADI also provides improvements in both strength and ductility compared to conventional ADI having a silicon content of 2.4-2.6 weight-%, due to the reduced segregation of mainly manganese and molybdenum, to the avoidance of the formation of embrittling carbides and to the increased amount of carbon in the stabilized austenite providing the ductile matrix.

According to an embodiment of the invention, the silicon content is greater than or equal to 3.70 weight-%. According to another embodiment of the invention the ADI is obtainable by performing a heat treatment using an austenitization temperature of at least 930° or at least 950° C.

According to an embodiment of the invention the austempered ductile iron exhibits an ultimate tensile strength of at least 900 MPa, preferably at least 1000 MPa and most preferably at least 1050 MPa.

According to another embodiment of the invention the austempered ductile iron exhibits a yield strength of at least 650 MPa, preferably at least 750 MPa and most preferably at least 850 MPa.

According to a further embodiment of the invention the austempered ductile iron exhibits a fracture elongation of at least 9%.

According to a yet further embodiment of the invention the microstructure of the austempered ductile iron contains less than 5% non-austenitized ferrite, preferably less than 3% (determined using a point counting method or image analysis). Since a completely ausferritic structure is desired in the part/parts of a component that is/are subjected to stress or strain, or to the greatest stress or strain, the microstructure of said part/parts should therefore contain less 5% non-austenitized ferrite, preferably less than 3%. This is obtained by applying increasing austenitization temperature with increasing silicon amount.

According to an embodiment of the invention the austempered ductile iron has the following composition in weight-%:

| | |
|---|---|
| C | 3.0-3.6 |
| Si | 3.35-4.60 |
| Mn | max 0.4 |
| P | max 0.05 |
| S | max 0.02 |
| Cu | max 0.1 |
| Ni | max 0.1 |
| Mo | max 0.01 |
| balance Fe and normally occurring impurities. | |

The composition above concerns an unalloyed ductile iron. The expression "un-alloyed" is intended to mean that no copper, nickel or molybdenum has been added to the ductile iron, i.e. the composition of the ductile iron comprises a maximum of 0.1 weight-% of Cu or Ni and a maximum of 0.01 weight-% of Mo.

According to another embodiment of the invention the austempered ductile iron also contains increased levels of metallic elements commonly used in conventional ADI to further raise the hardenability above the level obtained by the increased silicon content, resulting in the following composition in weight-%:

| | |
|---|---|
| C | 3.0-3.6 |
| Si | 3.35-4.60 |
| Mn | max 0.4 |
| P | max 0.05 |
| S | max 0.02 |
| Cu | max 0.8 |
| Ni | max 2.0 |
| Mo | max 0.3 |
| balance Fe and normally occurring impurities. | |

According to another embodiment of the invention the austempered ductile iron is obtainable by performing an ADI-heat treatment on an alloyed or an un-alloyed ductile iron with silicon content of 3.35 to 4.60 weight-%, i.e. a solution-strengthened ferritic ductile iron is used as a precursor to produce ADI with an optimized ausferritic microstructure.

The present invention also concerns a method for producing an austempered ductile iron for components requiring high strength and/or ductility. The method comprises the step of producing the ADI from an alloyed or an un-alloyed ductile iron with a silicon content of 3.35 to 4.60 weight-%.

According to an embodiment of the invention said un-alloyed ductile iron has the following composition in weight-%:

| | |
|---|---|
| C | 3.0-3.6 |
| Si | 3.35-4.60 |
| Mn | max 0.4 |
| P | max 0.05 |
| S | max 0.02 |
| Cu | max 0.1 |
| Ni | max 0.1 |
| Mo | max 0.01 |
| balance Fe and normally occurring impurities. | |

According to another embodiment of the invention said alloyed ductile iron has the following composition in weight-%:

| | |
|---|---|
| C | 3.0-3.6 |
| Si | 3.35-4.60 |
| Mn | max 0.4 |
| P | max 0.05 |
| S | max 0.02 |
| Cu | max 0.8 |
| Ni | max 2.0 |
| Mo | max 0.3 |
| balance Fe and normally occurring impurities. | |

According to an embodiment of the invention the method comprises the step of austenitizing at least one part of the un-alloyed ductile iron at a temperature of at least 910° C., preferably at least 930° or 950° C., depending on the silicon content. According to another embodiment of the invention the method comprises the step of maintaining said austenitization temperature for a period of at least 30 minutes. According to an embodiment of the invention the austenitizing step is carried out in a nitrogen atmosphere, argon atmosphere, a salt bath or any reducing atmosphere, such as a dissociated ammonia atmosphere to prevent the oxidation of carbon.

The present invention further concerns a method for forming a component consisting of austempered ductile iron. The method comprises the steps of forming a melt comprising alloyed or un-alloyed ductile iron with a silicon content of 3.35 to 4.60 weight-%, casting the component into a desired shape from the melt and allowing the component to cool. At least one part of the cooled component is then heated at a first temperature of at least 910° C., preferably at least 930° or 950° C. and held at this temperature for a predetermined time to austenitize said component. The expression "a predetermined time" in this step is intended to mean a time sufficient to heat the entire component, or the part(s) thereof that is/are to be austenitized, to the austenitizing temperature and to saturate the austenite with carbon to produce an ausferrite structure. The austenitizing may be accomplished using a high temperature salt bath, a furnace or a localized method such as flame or induction heating.

The component is then quenched in a salt bath, at a rate sufficient to prevent the formation of pearlite. The casing is then austempered at a temperature between 250-400° C., preferably 350-380° C., and held at that temperature for a predetermined time, such as 30 minutes to two hours depending on section size, before being cooled to room temperature. The expression "a predetermined time" in this step is intended to mean a time sufficient to produce a matrix of ausferrite in the component or part(s) thereof. The austempering step may be accomplished using a salt bath, hot oil or molten lead or tin.

According to an embodiment of the invention the method comprises the step of machining the component after it has been cast but before the austenitizing step until the desired tolerances are met. It is namely favourable to carry out as much of the necessary machining of the components as possible before the ADI-treatment. The inventive method results in the formation of an ADI that allows the advantages of solution hardened (3.35-460 weight-% Si) ferritic ductile iron to be utilized on casting and machining. The cast and machined component is thereafter austempered by austenitization at a temperature of at least 910° C. to obtain improved ductility and strength as compared to conventional ADI, since the inventive ADI results in a solution strengthening of silicon in both acicular ferrite and stabilized austenite, together with the silicon prevention of embrittling carbide precipitation. Alternatively or additionally, the component may be machined after the austempering step, for example, if some particular surface treatment is required.

The present invention also concerns a component that comprises an austempered ductile iron according to any of the embodiments of the invention. Such a component is intended for use particularly, but not exclusively, in mining, construction, agriculture, earth moving, manufacturing industries, the railroad industry, the automobile industry, the forestry industry, in applications where high wear resistance is required or in applications in which strict specifications must be met consistently.

BRIEF DESCRIPTION OF THE DRAWINGS

The present invention will hereinafter be further explained by means of non-limiting examples with reference to the appended figures where.

DETAILED DESCRIPTION OF EMBODIMENTS

Figure 1:
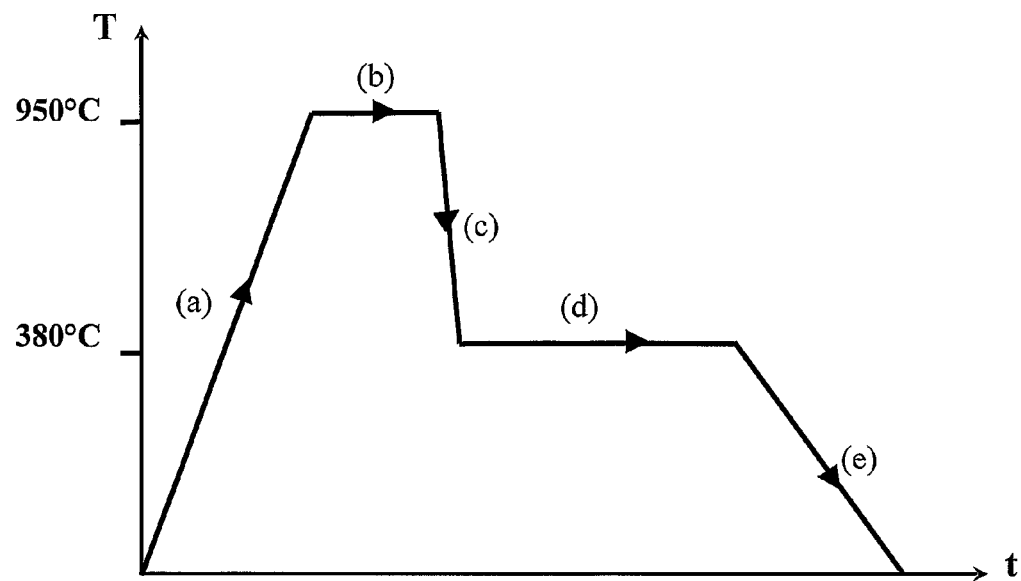
FIG. 1 schematically shows the austempering two-step ADI-heat treatment cycle according to an embodiment of the invention.

FIG. 1 shows an ADI heat treatment cycle according to an embodiment of the invention. An alloyed or unalloyed ductile iron component having a silicon content of 3.35-4.60 weight-% is heated [step (a)] and held at an austenitizing temperature of between 910-1000° C. for a time [step (b)] until the component becomes fully austenitic and the matrix becomes saturated with carbon. The component may for example be a suspension or powertrain-related component for use in a heavy goods vehicle, such as a spring hanger, bracket, wheel hub, brake calliper, timing gear, cam, camshaft, annular gear, clutch collar or pulley. After the component is fully austenitized, it is quenched at a high quenching rate [step (c)], such as 150° C./min or higher in a quenching medium and held at an austempering temperature of between 250-400° C., preferably 350-380° C. [step (d)]. After isothermal austempering, the component is cooled to room temperature [step (e)]. The ADI component may then be used in any application in which it is likely to be subjected to stress, strain, impact and/or wear under a normal operational cycle.

Figure 2:
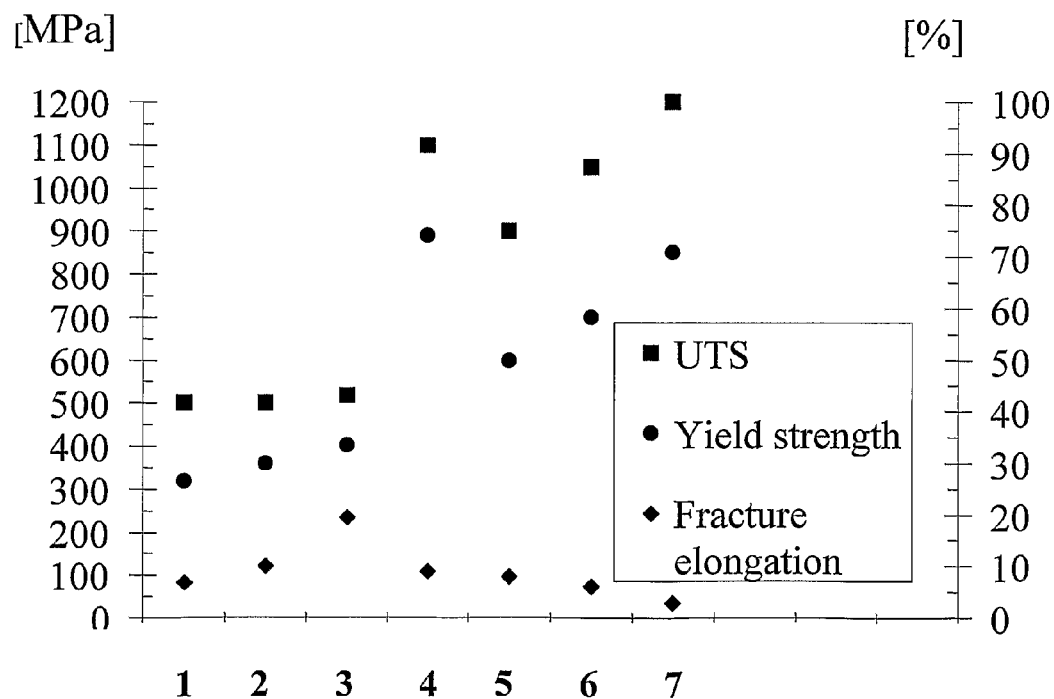
FIG. 2 shows a comparison of mechanical properties of conventional ductile iron, solution strengthened ductile iron, inventive ADI and conventional ADI.

FIG. 2 shows a comparison of the mechanical properties of seven different groups of ductile iron samples, namely the ultimate tensile stress (UTS) in MPA, yield strength in MPa and fracture elongation in %.

| Sample no. | Designation | Description |
|---|---|---|
| 1 | ISO 1083/JS/500-7 standard | Ferritic-pearlitic ductile iron, 2.5% Si |
| 2 | ISO 1083/JS/500-10 standard | 100% ferritic ductile iron, 3.7% Si |
| 3 | Solution strengthened ductile iron | 100% ferritic ductile iron, 3.66% Si |
| 4 | Inventive ADI | ADI based on 100% ferritic ductile iron, 3.66% Si, austenitized at 910° C. for 1 h, austempered at 380° C. for 1 h |
| 5 | ISO 17804/JS/900-8 standard | Conventional ADI, 2.5% Si |
| 6 | ISO 17804/JS/1050-6 standard | Conventional ADI, 2.5% Si |
| 7 | ISO 17804/JS/1200-3 standard | Conventional ADI, 2.5% Si |

Ductile iron ISO 1083/JS/500-10 (group 2) which has a completely ferritic microstructure was developed to replace the ferritic-pearlitic microstructure of ductile iron ISO 1083/JS/500-7 (group 1). Ductile iron ISO 1083/JS/500-10 (group 2) was namely solution strengthened by increasing its silicon content from 2.5% to 3.7% whereby both yield strength and fracture elongation were considerably raised while the UTS was raised to a lesser extent.

As can be seen from FIG. 2, the inventive ADI samples (group 4) exhibit more than twice the yield strength and UTS of the nodular ductile iron samples (groups 1, 2, 3). The inventive ADI samples (group 4) further exhibit higher yield strengths and fracture elongations than all of the conventional ADI samples (groups 5-7), and a higher UTS than the first two conventional ADI samples (groups 5, 6).

Despite surprisingly good mechanical properties for the ADI samples having a high silicon content (group 4), a remnant (<5%) of non-austenitized ferrite were found at 910° C. This indicates that the austenitizing temperature should have been higher; namely at least 930° C. or even 950-970° C. in order to increase the carbon content to 0.65-0.75 weight-% in the austenite before quenching to austempering temperature, where the austenite is further enriched in carbon during the precipitation of acicular ferrite and thus thermodynamically stabilized. For conventional ductile iron having a silicon content of 2.5 weight-%, the carbon content reach the same level of 0.65-0.75 weight-% already at 850-890° C.

The invention claimed is:

1. An austempered ductile iron (ADI) for components requiring high strength and ductility, comprising:
   a silicon content of 3.40 weight-% to 4.60 weight-%,
   wherein the austempered ductile iron (ADI) is obtainable by performing an ADI-heat treatment using an austenitization temperature of at least 920° C., and the austempered ductile iron (ADI) has an ausferric microstructure of acicular ferrite in a matrix of austenite.

2. The austempered ductile iron (ADI) according to claim 1, wherein the austempered ductile iron has a silicon content greater than or equal to 3.7 weight-%.

3. The austempered ductile iron (ADI) according to claim 1, wherein the austempered ductile iron is obtainable by performing an ADI-heat treatment using an austenitization temperature of at least 930°.

4. The austempered ductile iron (ADI) according to claim 1, wherein the austempered ductile iron's microstructure contains less than 5% non-austenitized ferrite.

5. A component comprising the austempered ductile iron (ADI) according to claim 1.

6. The austempered ductile iron (ADI) according to claim 1, having a following composition in wt %:

| | |
|---|---|
| C | 3.0-3.6 wt %; |
| Si | 3.40-4.60 wt %; |
| Mn | max 0.4 wt %; |
| P | max 0.05 wt %; |
| S | max 0.02 wt %; |
| Cu | max 0.01 wt %; |
| Ni | max 0.1 wt %; |
| Mo | max 0.01 wt %; and |
| balance Fe and normally occurring impurities. | |

7. The austempered ductile iron (ADI) according to claim 1, having a following composition in wt %:

| | |
|---|---|
| C | 3.0-3.6 wt %; |
| Si | 3.40-4.60 wt %; |
| Mn | max 0.4 wt %; |
| P | max 0.05 wt %; |
| S | max 0.02 wt %; |
| Cu | max 0.8 wt %; |
| Ni | max 2.0 wt %; |
| Mo | max 0.3 wt %; and |
| balance Fe and normally occurring impurities. | |

8. A component for use in mining, construction, agriculture, earth moving, manufacturing industries, the railroad industry, the automobile industry, or the forestry industry, comprising an austempered ductile iron (ADI) according to claim 1.

9. The component according to claim 8, wherein the component is a suspension or powertrain component for use in a heavy goods vehicle selected from the group consisting of a spring hanger, bracket, wheel hub, brake calliper, timing gear, cam, camshaft, annular gear, clutch collar and pulley.

10. A method for producing an austempered ductile iron (ADI) for components requiring high strength and ductility in at least a part thereof, comprising:
    producing the austempered ductile iron (ADI) from an alloyed or un-alloyed ductile iron with a silicon content of 3.40 weight-% to 4.60 weight-%, wherein the austempered ductile iron (ADI) has an ausferric microstructure of acicular ferrite in a matrix of austenite.

11. The method according to claim 10, further comprising:
    austenitizing at least part of the un-alloyed ductile iron (ADI) at a temperature of at least 920° C.

12. The method according to claim 10, wherein the un-alloyed ductile iron has a following composition in wt %:

| | |
|---|---|
| C | 3.0-3.6 wt %; |
| Si | 3.40-4.60 wt %; |
| Mn | max 0.4 wt %; |
| P | max 0.05 wt %; |
| S | max 0.02 wt %; |
| Cu | max 0.1 wt %; |
| Ni | max 0.1 wt %; |
| Mo | max 0.01 wt %; and |
| balance Fe and normally occurring impurities. | |

13. The method according to claim 10, wherein the un-alloyed ductile iron has a following composition in wt %:

| | |
|---|---|
| C | 3.0-3.6 wt %; |
| Si | 3.40-4.60 wt %; |
| Mn | max 0.4 wt %; |
| P | max 0.05 wt %; |

-continued

| | |
|---|---|
| S | max 0.02 wt %; |
| Cu | max 0.1 wt %; |
| Ni | max 0.1 wt %; |
| Mo | max 0.01 wt %; and |
| balance Fe and normally occurring impurities. | |

14. A method for forming a component of austempered ductile iron (ADI), comprising:
 forming a melt comprising alloyed or un-alloyed ductile iron with a silicon content of 3.40 weight-% to 4.60 weight-%;
 casting a component from said melt;
 allowing said component to cool;
 heat treating a least one part of said cooled component at a first temperature of at least 920° C. and holding said at least one part of the component at said temperature for a predetermined time to austenitize said components; and
 quenching said heat treated component at a quenching rate sufficient to prevent the formation of pearlite, such as at least 150° C./min, to a second temperature within the temperature range of 250-400° C., preferably 350-380° C., and holding said at least one part of the component at said temperature for a predetermined time to austemper said at least one part of the component, wherein the austempered ductile iron (ADI) has an ausferric microstructure of acicular ferrite in a matrix of austenite.

15. The method according to claim 14, wherein the un-alloyed ductile iron has a following composition in wt %:

| | |
|---|---|
| C | 3.0-3.6 wt %; |
| Si | 3.40-4.60 wt %; |
| Mn | max 0.4 wt %; |
| P | max 0.05 wt %; |
| S | max 0.02 wt %; |
| Cu | max 0.8 wt %; |
| Ni | max 2.1 wt %; |
| Mo | max 0.3 wt %; and |
| balance Fe and normally occurring impurities. | |

16. The method according to claim 14, wherein the un-alloyed ductile iron has a following composition in wt %:

| | |
|---|---|
| C | 3.0-3.6 wt%; |
| Si | 3.40-4.60 wt %; |
| Mn | max 0.4 wt %; |
| P | max 0.05 wt %; |
| S | max 0.02 wt %; |
| Cu | max 0.8 wt %; |
| Ni | max 2.1 wt %; |
| Mo | max 0.3 wt %; and |
| balance Fe and normally occurring impurities. | |

* * * * *